June 14, 1966            A. F. EADIE            3,255,986
RECEPTACLE SUPPORT AND FRICTIONAL LID RETAINING MECHANISM
Filed Jan. 18, 1965            3 Sheets-Sheet 1
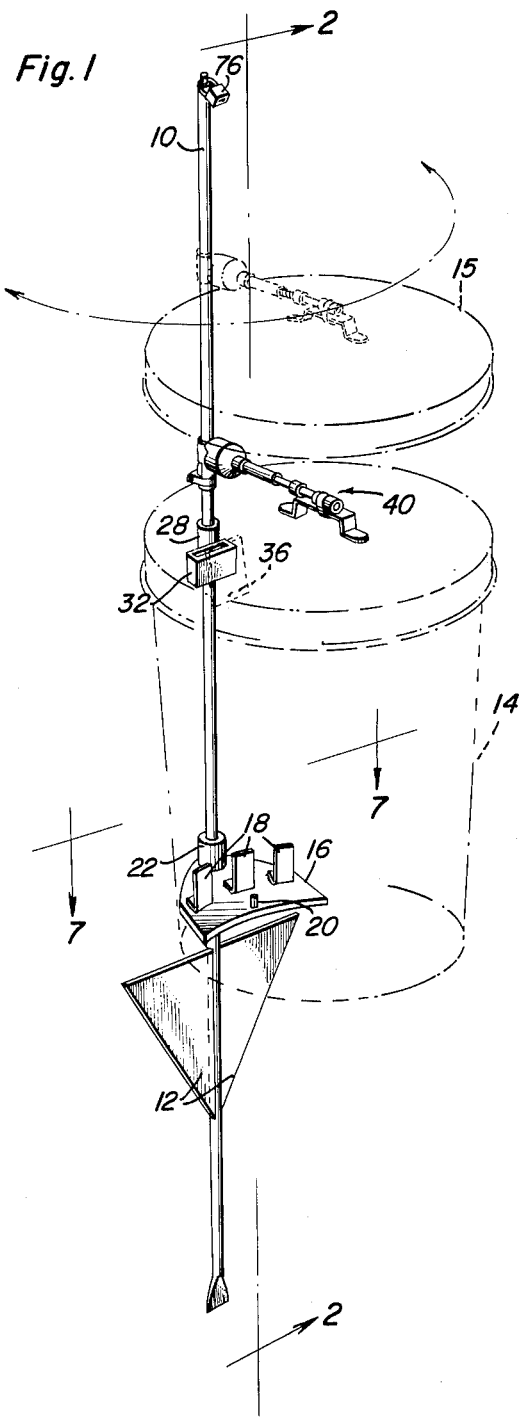
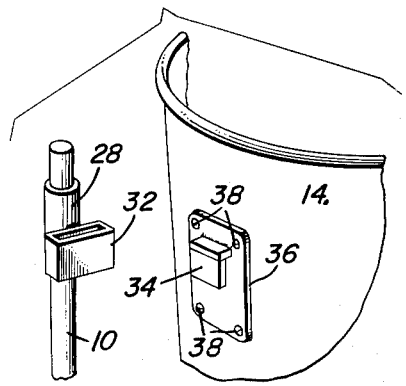
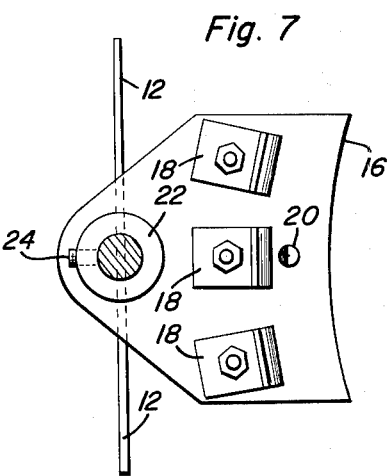
Arthur F. Eadie
INVENTOR.

June 14, 1966  A. F. EADIE  3,255,986
RECEPTACLE SUPPORT AND FRICTIONAL LID RETAINING MECHANISM
Filed Jan. 18, 1965  3 Sheets-Sheet 2
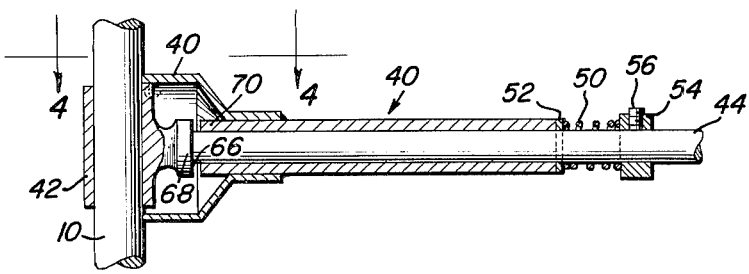
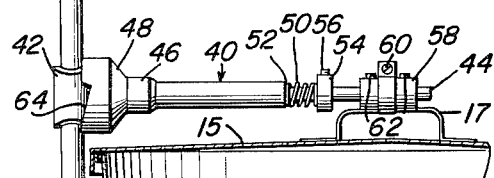
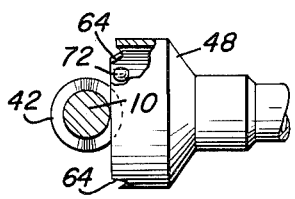
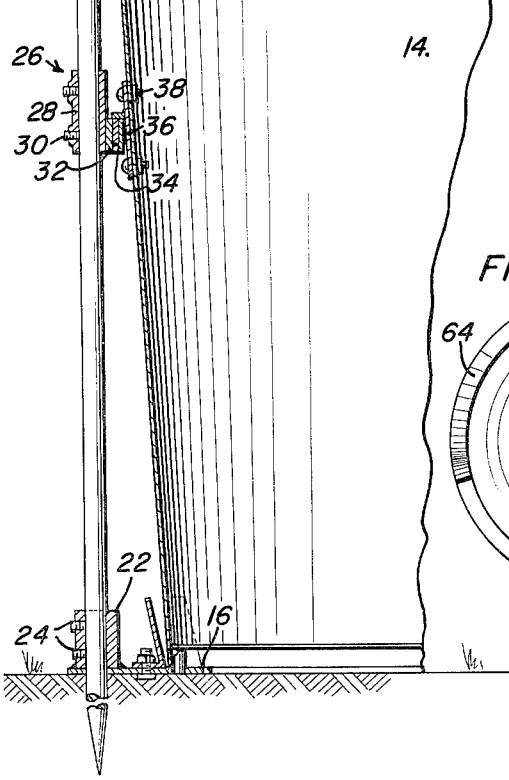
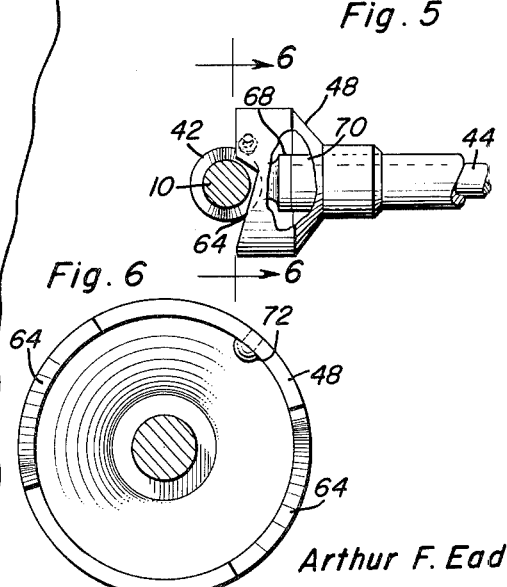
Arthur F. Eadie
INVENTOR.
BY *Clarence A. O'Brien*
*and Harvey B. Jackson*
Attorneys June 14, 1966  A. F. EADIE  3,255,986
RECEPTACLE SUPPORT AND FRICTIONAL LID RETAINING MECHANISM
Filed Jan. 18, 1965  3 Sheets-Sheet 3

Arthur F. Eadie
INVENTOR.

BY Clarence A. O'Brien
and Harvey B. Jacobson
Attorneys

United States Patent Office 3,255,986
Patented June 14, 1966

3,255,986
RECEPTACLE SUPPORT AND FRICTIONAL
LID RETAINING MECHANISM
Arthur F. Eadie, 601½ B St., Taft, Calif.
Filed Jan. 18, 1965, Ser. No. 426,208
4 Claims. (Cl. 248—147)

The present invention relates to a receptacle support and more specifically to a receptacle support with a frictional lid retaining mechanism. The improved lid retaining mechanism of the present invention prevents the lid of the can from being pried off by animals or blown off by the wind for example.

Previous attempts to design receptacle supports for garbage cans with hold-downs for the garbage can lid have been generally unsatisfactory by permitting convenient access to the interior of the receptacle when necessary, such as during placing of debris in the receptacle, but improperly securing the receptacle lid against entry by animals or dislodgement by the wind.

A need therefore exists for a receptacle support or support for a garbage can which will be relatively inexpensive to manufacture, durable in use, and which will function to properly hold the receptacle and its associated lid while permitting convenient access to the interior of the receptacle by means of a lid hold-down which may readily be moved to gain access to the interior of the receptacle.

It is a principal object of the invention to provide a receptacle support and frictional lid retaining mechanism which is simple in design, effective in purpose, sturdy in use and relatively inexpensive to manufacture.

A further object of this invention is to provide a receptacle support and frictional lid retaining mechanism which is suitable for use with receptacles, such as garbage cans, of varying dimensions.

A further object of this invention is to provide a frictional lid retaining mechanism which securely retains the lid of the receptacle in a closed position to preclude unwarranted access to the container while permitting ready access to the interior of the container when it is necessary to place debris and/or other material therein.

Further objects and advantages of the present invention will become apparent as the following description proceeds.

Briefly, the present invention resides in a device of simple structure which is comprised primarily of a wall bracket secured or ground engaging vertical support member, or rod, which carries thereon support means for the receptacle to be supported, and a lid retaining mechanism which is slidable thereon and secured in position by a frictional means. Both the receptacle support means and the frictionally engaged lid supporting mechanism are adjustable to accommodate receptacles of varying heights as well as circumferences.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view in elevation of one embodiment of the receptacle support, further showing, in broken lines, placement of the receptacle supported thereon;

FIGURE 2 is a slightly enlarged side elevational view taken along the line 2—2 of FIGURE 1, and further showing portions of the receptacle and receptacle support means in section;

FIGURE 3 is a fragmentary side elevational view of the slidable, frictionally retained, lid retaining means, with portions shown in section;

FIGURE 4 is a fragmentary top elevational view of a portion of the lid retaining means taken along the line 4—4 of FIGURE 3, and further showing portions of the retaining means in frictional engagement with the supporting rod;

FIGURE 5 is a fragmentary elevational view of the lid retaining means shown disengaged from the supporting rod to permit vertical movement of the supporting means;

FIGURE 6 is an enlarged rear elevational view of the frictional engaging means of FIGURE 5 taken along the line 6—6 of FIGURE 5;

FIGURE 7 is an enlarged top plan view of the lower support means for the receptacle shown mounted on the support rod taken along line 7—7 of FIGURE 1;

FIGURE 8 is an exploded, fragmentary perspective view showing the upper support means for the receptacle;

Figure 9:
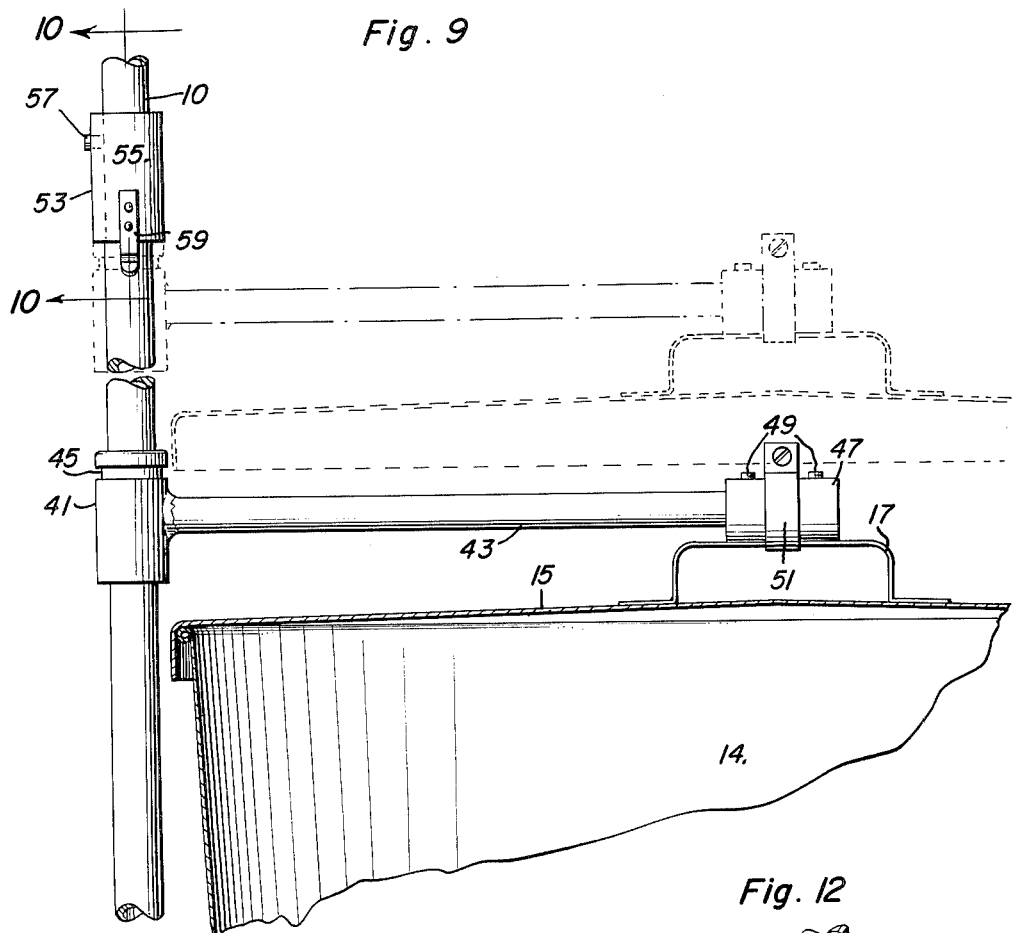
FIGURE 9 is a side elevational view of a modification of the frictionally engaged lid retaining means of FIGURE 1, further showing the lid retaining means in both the closed and open position.

Referring now to the drawings in detail and particularly to FIGURE 1 it may be seen that the receptacle support includes a vertical support member 10, which may be formed of a solid metallic rod or pipe. Adjacent the lower end of the vertical support member 10 are secured a plurality of triangular stabilizing fins 12. The stabilizing fins 12 cooperate to stabilize the vertical support member 10 when it is inserted into the ground at the point where it is desirous to locate the receptacle support. A receptacle, generally indicated at 14, is removably supported by the vertical support rod 10 and its associated lower receptable support member, which includes a lower receptacle support plate 16. As best seen in FIGURES 1 and 7, the lower receptacle support plate 16 includes a plurality of upstanding receptacle aligning members 18 which are secured to the lower receptacle support plate 16 by suitable means such as bolting, welding, riveting or the like. The upstanding receptacle aligning members 18 cooperate to align the lower outside edge of the receptacle 14. The lower receptacle support plate 16 also has secured thereto in upstanding relationship, a pin 20 which cooperates with the upstanding aligning members 18 to position the lower edge of the receptacle 14. The lower receptacle support plate 16 is slidably received upon the vertical support member 10 by means of a lower support sleeve 22 which may be secured in position on the vertical support member 10 by means of setscrews 24 or the like.

An upper receptacle support means generally indicated at 26 cooperates with the lower receptacle support plate 16 to support the receptacle 14. The upper receptacle support means 26 includes an upper support sleeve 28 which is slidable upon the vertical support member 10 and may be secured in position thereon by means of setscrews 30 or the like. The upper support sleeve 28 has secured thereto an eye 32 which cooperates with a hook 34 which is secured by means of welding for example to a plate 36 which in turn is secured to the receptacle 14 by means of bolts, rivets 38 or the like.

It may therefore be seen that the upper portion of the receptacle 14 is secured in such a manner that the instant support may be adjusted on the vertical support member 10 to accommodate receptacles of varying heights.

As best seen in FIGURES 1 and 2, a frictional lid retaining mechanism generally indicated at 40 is slidably and rotatably carried by the vertical support member 10 and functions as a means of releasably securing the lid 15 of the container 14 in sealing relationship. The friction lid retaining mechanism 40 includes a support arm sliding sleeve 42 which is rotatably and slidably positioned on vertical support member 10. The support arm sliding sleeve 42 has an integral cantilevered support arm 44 which carries a frictional support arm locking means generally indicated at 46. The support arm frictional locking means 46 includes a rotating friction grip bell collar 48 which is biased towards the vertical support member 10 by coil spring 50. To prevent binding of the rotating friction grip bell collar 48, a washer 52 is positioned on the support arm 44 between the coil spring 50 and the friction grip bell collar 48. The tension on the spring 50 is adjusted by means of a bushing 54 which is slidable on the support arm 44 and is secured by means of a setscrew 56 or the like, which is threadably received in the bushing 54. The complete operation of the support arm frictional locking means 46 will be described in detail later.

As best seen in FIGURES 1 and 2, the support arm 44 has secured adjacent its free end a lid-handle retaining bushing 58 to which the handle 17 of the receptacle lid 15 is secured by means of a clamp 60. The clamp 60 may be a hose clamp, for example. The lid-handle retaining bushing 58 is secured in alignment with the cover handle 17 upon the support arm 44 and is secured thereat by means of setscrews 62. It may therefore be seen that the lid-handle retaining bushing 58 and its associated clamp 60 may be adjusted on the support arm 44 to accommodate receptacles of varying circumference. As best seen in FIGURE 1 the friction lid retaining mechanism 40 is rotatably and slidably secured on the vertical support member 10. It may be seen in FIGURE 1 that the receptacle lid 15 which is secured to the friction lid retaining mechanism 40 has been moved upwardly out of engagement with the body of the receptacle 14. As indicated by the arcuate arrows in FIGURE 1 the container lid 15 may be rotated out of alignment with the opening of the receptacle 14. The frictional lid retaining mechanism 40 is slidable upon the vertical support member 10 and securable thereon by means of the support arm frictional locking means 46. As best seen in FIGURE 4 the rotating friction grip bell collar 48 is shown in frictional engagement with the vertical support member 10. As stated previously the rotating friction grip bell collar 48 is biased against the vertical support member 10 by means of the spring 50. In the position shown in FIGURE 4 the frictional lid retaining mechanism 40 would be secured against slidable movement upon the vertical support member 10.

Referring now to FIGURE 5 it may be seen that the rotating friction grip bell collar 48 includes a pair of cam surfaces 64 which are 180° apart on the circumference of the outer edge of the bell collar 48. As seen in FIGURE 5 the bell collar 48 has been rotated counterclockwise with respect to the support arm 44 approximately 90°. In this position it may be seen that the bell collar 48 is no longer in frictional engagement with the vertical support member 10. Accordingly, the support sliding sleeve 42 may be slid longitudinally of the vertical support member 10 such as might be the case in moving the frictional lid retaining mechanism 40 into the upper position as shown in broken lines in FIGURE 1. The bell collar 48 in the position shown in FIGURE 5 is prevented from frictionally engaging the vertical support member 10 by virtue of a stop means generally indicated at 68. The bell collar stop means 68 includes a shoulder 66 on the support arm 44 which cooperates with an extension 70 of the reduced portion of the bell collar 48.

It may therefore be seen, that as the spring 50 biases the bell collar 48 toward the vertical support member 10, when the bell collar is in the position shown in FIGURE 5 that the extension 70 of the bell collar 48 and the stop surface collar 68 of the support arm 44 will come into contact thereby preventing frictional engagement of the bell collar 48 with the vertical support member 10 by virtue of the deepest recess of the cam surfaces being opposite the vertical support member 10. As best seen in FIGURE 6 a rotary stop button 72 is secured to the inner surface of the bell collar 48 to limit rotation of the bell collar 48 to approximately 90°. It may therefore be seen that it is only necessary to rotate the bell collar 48, 90° to transport it from the position shown in FIGURE 4, which is the lock position, to the unlocked position as shown in FIGURE 5. The rotary stop button 72 accordingly prevents rotating the bell collar 48 past the position shown in FIGURE 5 whereby the bell collar 48 might again come into frictional engagement with a vertical support member 10. As seen in FIGURES 1 and 2 the vertical support member 10 may be provided with an aperture 74 for the purpose of receiving a lock 76 to prevent unauthorized removal of the frictional lid retaining mechanism 40.

Figure 10:
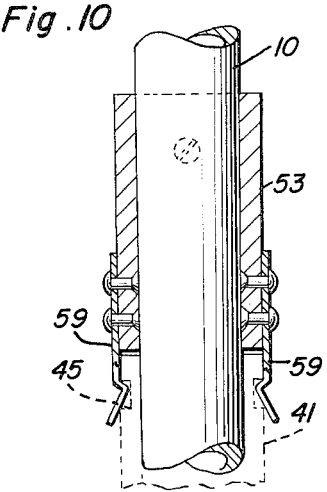
FIGURE 10 is an enlarged side elevational view taken along line 10—10 of FIGURE 9 illustrating the frictional means for retaining the lid retaining means in open position, with portions broken away to show the mounting of the frictional engaging means.

Referring now to FIGURE 9, there is illustrated a modification of the frictional lid retaining mechanism generally indicated at 40. The modification of the lid retaining mechanism includes a support arm sliding sleeve 41 and its integral cantilevered support arm 43. The support arm sliding sleeve 41 is longitudinally slidable upon the vertical support member 10. Adjacent its upper end is an annular recess 45. Adjacent the free end of the support arm 43 is positioned the lid-handle retaining bushing 47. The bushing is secured in position upon the support arm 43 by means of setscrews 49. The lid 15 of the container 14 is secured to the bushing 47 by means of a clamp 51 passing around the bushing and the handle 17 of the lid of the container 14. A frictional detent generally indicated at 53 is provided for the purpose of securing the lid retaining mechanism in its uppermost position as seen best in FIGURE 9. The detent 53 includes a sleeve 55 which is slidable upon the vertical support member 10 and may be secured thereon by means of a set screw 57. A plurality of spring detents 59 are secured to the sleeve 55 by suitable means such as riveting or bolting, for example, as best seen in FIGURE 10. As shown by the broken line in FIGURE 9, when the support arm 43 is moved upwardly on the vertical support member 10 the spring detents 59 engage the annular recess 45 of the support arm sliding sleeve 41.

Figure 11:
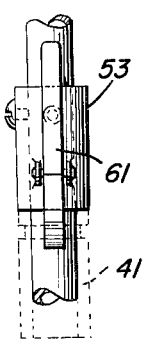
FIGURE 11 is a front elevational view of a modified form of the frictional engaging means of the device of FIGURE 10.
Figure 12:
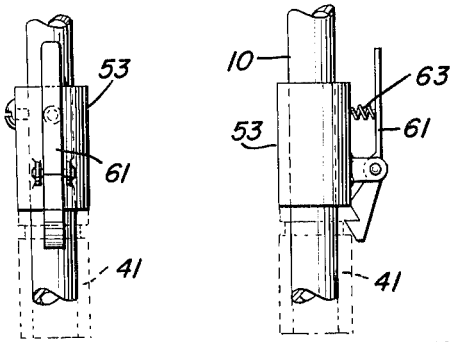
FIGURE 12 is a side elevational view of the device of FIGURE 11.

FIGURES 11 and 12 illustrate a modified form of the detent means shown in FIGURE 9. In this modification the spring detents 59 are replaced by pivotally secured, spring biased detent member 61. In operation the pivotally secured detent 61 functions in a manner similar to the spring detents 59, with the added advantage that the detents 61 may employ a stiffer spring than might otherwise be possible with the use of spring detents 59, due to the fact that manual pressure may be applied to the free end of the detent 61 to disengage it from the annular recess 45 of the support arm sliding sleeve 41.

In operation the form of invention shown in FIGURES 1 through 8 would be forced into the ground so that the triangular stabilizing fins 12 would stabilize the vertical support member 10. Or, the vertical support member 10 may be held rigidly in place against a wall surface by means of an upper and lower wall bracket (not shown). The lower receptacle support plate member 16 would be secured adjacent the ground for the purpose of further stabilizing the vertical support member 10 and providing aligning means for the lower edge of the receptacle 14. The suitably positioned plate 36 and its integral hook 34 carried by the receptacle 14 is hooked into the eye 32 of the sleeve 28 to secure the upper portion of the receptacle 14. With the bell collar 48 in the position shown in FIGURE 5, the lid 15 of the container 14 would be secured by means of the clamp 60 to the bushing 58 on the support arm 44. The cover 15 can then be rotated into alignment with the opening of the container 14 and the support arm sliding sleeve and its associated lid retaining mechanism 40 would then be moved downwardly into the position shown in full lines in FIGURE 2. The bell collar 48 would then be grasped in the hand and rotated clockwise into the position shown in FIGURES 1, 2 and 4. In this position, the lid retaining mechanism 40 would be in frictional engagement with the vertical support member 10 and thereby be prevented from moving upwardly. In order to gain access into the receptacle 14 it is merely necessary to rotate the bell collar 48 counter-clockwise to the position shown in FIGURE 5 thereby enabling the retaining mechanism 40 to be moved upwardly on the vertical support member 10 at the same time the container lid 15 may be rotated out of alignment with the opening of the receptacle 14 to permit introduction of debris and/or other material into the interior of the container 14. If desired, the container lid may be secured in the upper position as shown in FIGURE 1 in broken lines by again rotating the bell collar 48 to the position shown in FIGURE 4. This however, is not necessary because the lid retaining mechanism 40 would normally remain in the upper position shown in FIGURE 1 by virtue of the weight of the cantilevered arm and lid 15 causing the sliding sleeve to bind on the vertical support 10.

In operation, the device shown in FIGURES 9 through 12 would involve positioning the receptacle 14 by means of the lower support plate 16 and the hook 34 and eye 32 as previously described. The lid 15 would be secured to the support arm 43 by means of clamp 51 passing around the handle 17 and bushing 47. In this modification the weight of the sleeve 41 and arm 43 together with the close fit of the sleeve 41 on the vertical support member 10 would prevent any unwarranted opening of the receptacle 14, inasmuch as it would be necessary to grasp both the container lid and the sleeve 41 in moving the container lid into the broken line position shown in FIGURE 9. If the container lid alone was forced upwardly, such as might be the case, by an animal for example attempting to gain entry to the receptacle 14, the sleeve 41 by virtue of its close fit on vertical support member 10 would bind on the support 10 thereby precluding any longitudinal movement. As the sleeve is grasped and the container lid simultaneously grasped and moved upwardly into the broken line position indicated in FIGURE 9 the spring detent 59 of the upper detent means 53 will snap into engagement with the annular recess 45 of the sliding support arm sleeve 41. As stated previously the spring detent 59 may be replaced by a pivotally secured detent 61. To release the support arm from the broken line position shown in FIGURE 9 to reclose the receptacle, it is merely necessary to urge it downwardly overcoming the detents 59. With the detent means 53 provided with a pivotally secured detent 61 it is necessary to manually depress the upper free portion of the detent 61, against the bias of the spring 63 and then the support arm sleeve 41 and integral support arm 43 may be moved into the full line position shown in FIGURE 9.

It may therefore be seen that a receptacle support and frictional lid retaining mechanism of improved design has been provided.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a support for a refuse receptacle or the like, the combination of a vertical support member, said vertical support member having receptacle support means adjustably secured thereon, said adjustably secured receptacle support means including a first receptacle support adapted to be adjustably secured adjacent the lower edge of a receptacle to be supported, a second receptacle support adjustably secured to said support member and adapted to be adjustably secured adjacent the upper edge of a receptacle to be supported whereby a receptacle to be supported may be releasably secured, a receptacle lid retaining means longitudinally and rotatably adjustable on said vertical support member to permit selective positioning of said receptacle lid retaining means longitudinally and rotatably of said vertical support member, said receptacle lid retaining means being provided with means frictionally engaging said vertical support member, said friction engaging means including a sleeve slidable on said vertical support member, said sleeve having an integral container lid supporting arm cantilevered therefrom, means carried by said cantilevered arm to frictionally engage said vertical support member, said frictional means including a slidable, rotatable bell collar carried by said cantilevered arm, said bell collar having means biasing it against said support member in a first position and means cooperating to prevent frictional engagement with said vertical support member when said bell collar is rotated to a second position.

2. The structure of claim 1 wherein said friction engaging means includes at least a pair of cam surfaces on the portion of said bell collar contacting said vertical support member, said cam surfaces being 180° apart on the axial periphery of said bell collar adjacent said vertical support member.

3. The structure of claim 1 wherein the receptacle lid retaining means is provided with means frictionally engaging a frictional detent means carried by said vertical support member, said friction engaging means including a sleeve slidable between a first and second position on said vertical support member, said sleeve having an integral container lid supporting arm cantilevered therefrom, means carried by said slidable sleeve to frictionally engage said frictional detent means when sliding said sleeve from said first to said second position.

4. The structure of claim 1 wherein said means biasing said bell collar against said support member includes a spring means and a means adapted to adjustably tension said spring means.

References Cited by the Examiner

UNITED STATES PATENTS

| | | | |
|---|---|---|---|
| 2,295,909 | 9/1942 | Massey | 248—147 |
| 2,314,331 | 3/1943 | Fallis | 248—147 |
| 2,448,456 | 8/1948 | Niskanen et al. | 248—156 |
| 2,505,126 | 4/1950 | Logan | 248—151 |
| 2,582,906 | 1/1952 | Heldenbrand | 211—71 |
| 2,690,893 | 10/1954 | Mokhiber | 248—146 |
| 2,738,941 | 3/1956 | Laurich et al. | 248—145 |
| 2,905,333 | 9/1959 | Lownsbery | 211—83 |
| 2,927,755 | 3/1960 | Goforth | 248—124 |
| 3,003,728 | 10/1961 | Shaw | 248—154 |
| 3,173,547 | 3/1965 | Alissandratos | 211—71 |

CLAUDE A. LE ROY, *Primary Examiner.*